(12) United States Patent
Cavalcante (10) Patent No.: US 9,160,220 B2
(45) Date of Patent: Oct. 13, 2015

(54) LINEAR ACTUATOR PARTICULARLY FOR SLIDING DOORS AND FOR SLIDING DOOR OR WINDOW CLOSURE ELEMENTS IN GENERAL

(75) Inventor: Toni Cavalcante, Dueville (IT)

(73) Assignee: TOPP S.P.A A SOCIO UNICO, Sandrigo (IT)

( * ) Notice: Subject to any disclaimer, the term of this patent is extended or adjusted under 35 U.S.C. 154(b) by 0 days.

(21) Appl. No.: 13/374,384

(22) Filed: Dec. 27, 2011

(65) Prior Publication Data

US 2012/0260577 A1 Oct. 18, 2012

(30) Foreign Application Priority Data

Apr. 15, 2011 (IT) .............................. PD2011A0127

(51) Int. Cl.
| | |
|---|---|
| E05F 15/14 | (2006.01) |
| H02K 41/02 | (2006.01) |
| E05F 15/18 | (2006.01) |
| H02K 16/00 | (2006.01) |

(52) U.S. Cl.
CPC ............... H02K 41/02 (2013.01); E05F 15/18 (2013.01); H02K 16/00 (2013.01); *E05Y 2800/37* (2013.01); *E05Y 2900/132* (2013.01); *E05Y 2900/148* (2013.01)

(58) Field of Classification Search
USPC ............... 49/360, 361, 324, 125, 61, 63, 380, 49/413, 409, 410, 411
See application file for complete search history.

(56) References Cited

U.S. PATENT DOCUMENTS

| | | | | |
|---|---|---|---|---|
| 1,997,420 | A * | 4/1935 | Kiekert | 49/125 |
| 2,301,568 | A * | 11/1942 | Moss | 49/123 |
| 4,050,189 | A * | 9/1977 | Peterson | 49/26 |
| 4,067,144 | A * | 1/1978 | Ogishi | 49/360 |
| 4,541,202 | A * | 9/1985 | Dockery | 49/362 |
| 5,076,018 | A * | 12/1991 | Gianfranco | 49/410 |
| 5,197,225 | A * | 3/1993 | Yff | 49/223 |
| 5,447,346 | A * | 9/1995 | Virzi | 292/289 |
| 5,955,852 | A * | 9/1999 | Jentsch | 318/282 |
| 6,324,789 | B1 * | 12/2001 | Stephen | 49/362 |
| 7,290,369 | B2 * | 11/2007 | Tarrega Lloret | 49/123 |
| 2002/0157318 | A1 * | 10/2002 | Teubert et al. | 49/360 |
| 2010/0101150 | A1 * | 4/2010 | Huang | 49/409 |
| 2010/0139172 | A1 | 6/2010 | Bush | |

FOREIGN PATENT DOCUMENTS

| | | |
|---|---|---|
| DE | 196 41 879 A1 | 4/1998 |
| JP | 2005 253194 A | 9/2005 |
| WO | WO 2009/062834 A1 | 5/2009 |
| WO | WO 2009/116343 A1 | 9/2009 |

* cited by examiner

*Primary Examiner* — Katherine Mitchell
*Assistant Examiner* — Marcus Menezes
(74) *Attorney, Agent, or Firm* — Modiano & Associati; Albert Josif; Daniel O'Byrne

(57) ABSTRACT

A linear actuator particularly for sliding doors and for sliding door or window closure elements in general, comprising a box-like body, to be fixed with corresponding elements of fixing between the two jambs of a door or of a window or door frame, in order to move a leaf by translational motion, fixed drive elements being accommodated within the box-like body which are adapted to move corresponding transmission elements which are associated with the leaf. The box-like body is telescopic in structure in order to be adapted in length to the width of the space of the door, or other window or door frame, with which it is intended to be used.

13 Claims, 9 Drawing Sheets

LINEAR ACTUATOR PARTICULARLY FOR SLIDING DOORS AND FOR SLIDING DOOR OR WINDOW CLOSURE ELEMENTS IN GENERAL

The present invention relates to a linear actuator, particularly for sliding doors and for sliding door or window closure elements in general.

BACKGROUND OF THE INVENTION

Nowadays, in the field of automation of the home and of habitable spaces generally, the use is becoming more and more widespread of actuators for opening and closing inner doors as well.

The automation of "pocket" sliding doors is however currently still not common, since such pocket sliding doors are normally installed to be moved manually, and a subsequent mounting of actuation means in order to automate the translational motion of the leaf is relatively complex and inconvenient.

Such subsequent mounting requires in fact the removal of the jamb of the door for the mounting of parts of the actuation mechanism to be fixed to the leaf, as well as the addition of a box-like body to contain the actuation means, the latter being supported inside the box-like body by a metallic cross-member that constitutes the supporting structure for the actuator itself, to be arranged at the upper edge of the leaf after specific cutting to measure.

The box-like body and structural cross-member, in addition to representing a cost in their own right, exhibit the drawback of needing to be cut to measure according to the space of the door to which they are to be applied.

SUMMARY OF THE INVENTION

The aim of the present invention is to provide a linear actuator, particularly for sliding doors and for sliding door or window closure elements in general, that makes it possible to eliminate the drawbacks typical of conventional, similar linear actuators for sliding doors.

Within this aim, an object of the invention is to provide a linear actuator that is capable of being easily adapted to any width of the opening of the door with which it is intended to be used.

Another object of the invention is to provide a linear actuator that is compact and easily applied, even for a person with no special prior training.

A further object of the invention is to provide a linear actuator that is easy to assemble.

Another object of the invention is to provide a linear actuator particularly for sliding doors and for sliding door or window closure elements in general, that can be made using known systems and technologies.

This aim and these objects, as well as others that will become better apparent hereinafter, are achieved by a linear actuator particularly for sliding doors and for sliding door or window closure elements in general, comprising a box-like body, to be fixed with corresponding means of fixing between the two jambs of a door or of a window or door frame at the upper edge of a leaf to be moved by translational motion, fixed driven means being accommodated within said box-like body, which are adapted to move corresponding transmission means which are associated with said leaf, said linear actuator being characterized in that said box-like body is telescopic in structure in order to be adapted in length to the width of the space of the door with which it is intended to be used.

BRIEF DESCRIPTION OF THE DRAWINGS

Further characteristics and advantages of the invention will become better apparent from the description of a preferred, but not exclusive, embodiment of the linear actuator according to the invention, which is illustrated by way of non-limiting example in the accompanying drawings wherein:

FIG. 8 is a perspective view of an enlarged portion of FIG. 1a;

DESCRIPTION OF THE PREFERRED EMBODIMENTS

With reference to the figures, a linear actuator particularly for sliding doors and for sliding door or window closure elements in general is generally designated with the reference numeral 10.

Figure 1:
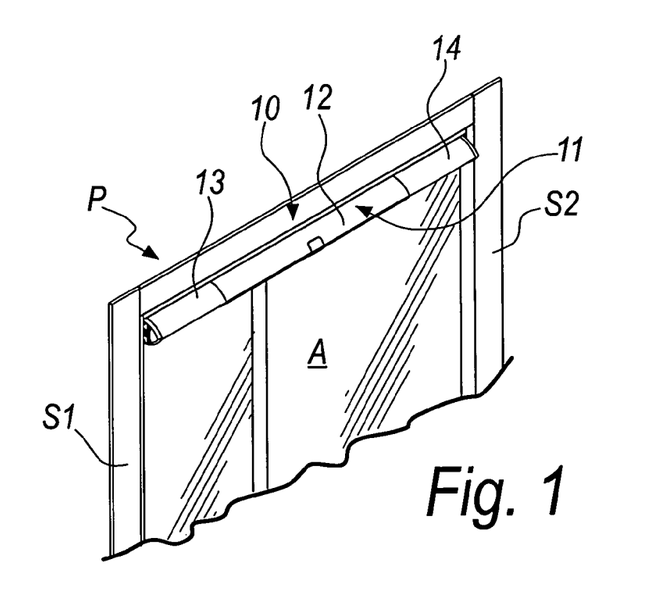
FIG. 1 is a perspective view of an actuator according to the invention, applied to a sliding door.
Figure 1A:
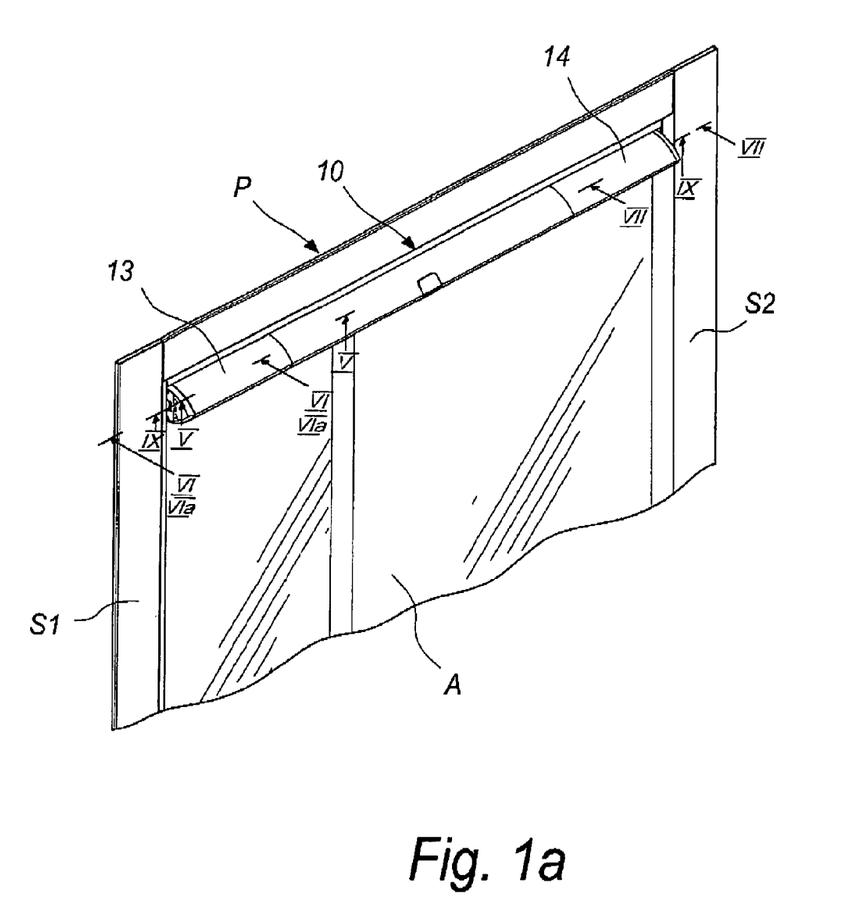
FIG. 1a illustrates an enlarged detail of FIG. 1, showing section lines.
Figure 2:
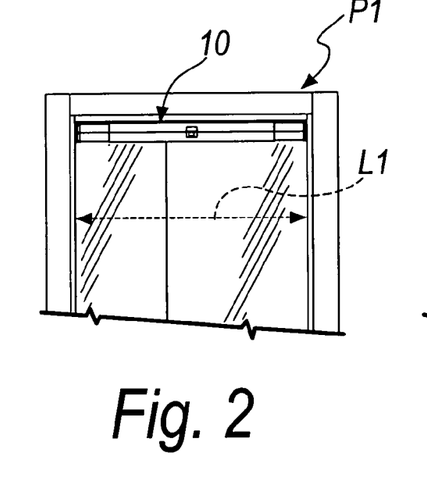
FIG. 2 is a front view of the actuator according to the invention, applied to a door having a first width of the passage space.
Figure 3:
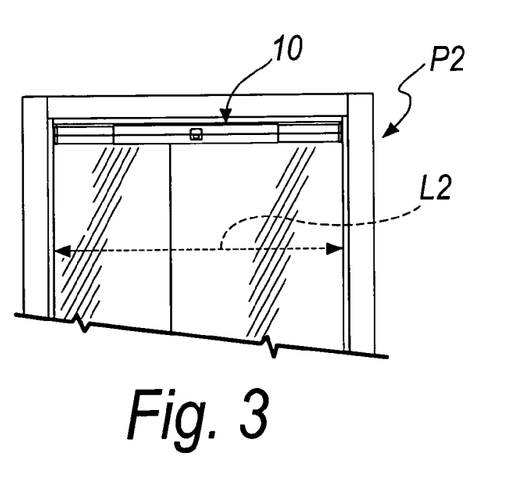
FIG. 3 is a front view of the actuator according to the invention, applied to a door having a second and different width of the passage space.

The actuator 10 comprises a box-like body 11, to be fixed with corresponding means of fixing between the two jambs S1 and S2 of a door P, or of a window or door frame generally, at, as in the examples shown in FIGS. 1 to 3, the upper rim of a leaf A to be moved by translational motion.

The peculiarity of the invention lies in the fact that the box-like body 11 is telescopic in structure in order to be adapted in length to the width of the space of the door with which it is intended to be used.

Moreover, advantageously, the means of fixing the box-like body are adjustable and self-adapting.

FIG. 2 shows the linear actuator 10 applied to a first door P1 having a first width L1 of the space of the door, while FIG. 3 shows the same linear actuator 10 applied to a second door P2 having a second width L2 of the space of the door that is greater than the width L1 of the first door P1.

In the embodiment of the invention described herein by way of non-limiting example of the invention, the box-like body 11 comprises a central tubular part 12 and two lateral parts 13 and 14 respectively, also tubular, that can be telescopically slid out from the central part 12.

The invention is understood to comprise any variations of embodiment comprising only one part that can be slid out, or even more than two parts that can be slid out laterally, for example comprising two lateral parts per side that can be slid out.

Figure 4:
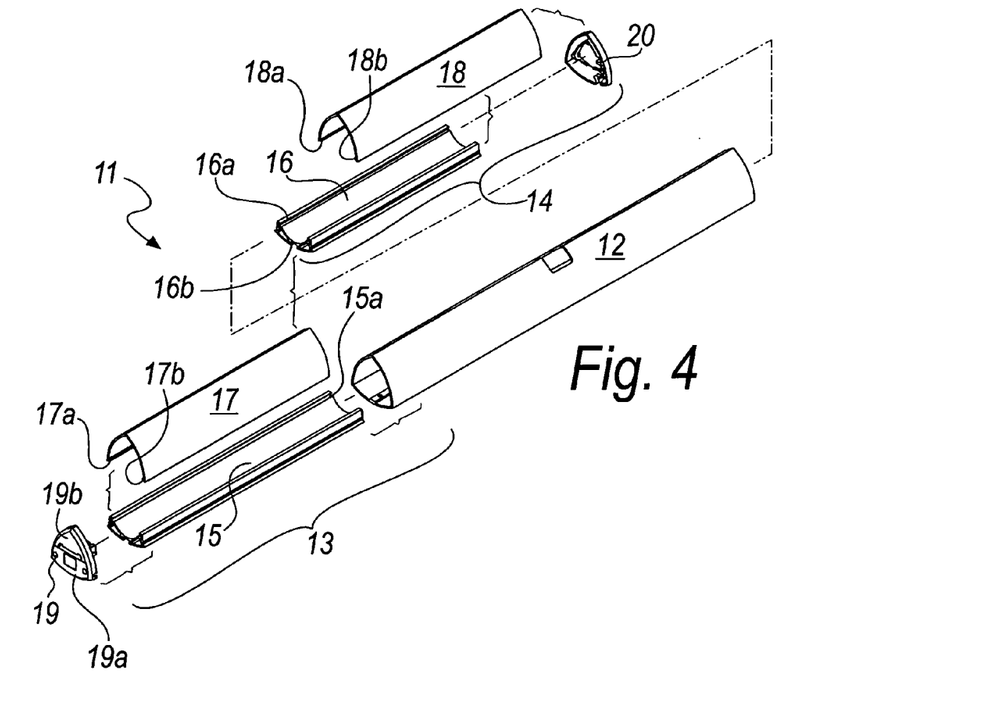
FIG. 4 is an exploded perspective view of a box-like body of the actuator according to the invention.

FIG. 4 is an exploded perspective view of the box-like body 11, from which it can be clearly seen how the two lateral parts 13 and 14 are each constituted by three pieces: a base, 15 and 16 respectively, a cover 17 and 18, which is removable, and a side plug 19 and 20.

The removable cover 17 and 18 is reversibly coupled to the corresponding base 15 and 16 by way of two opposing longitudinal anchoring appendages 17a and 17b and 18a and 18b, which are adapted to be inserted into corresponding grooves, for example 15a and 16a, defined on the respective bases 15 and 16.

The removability of the covers 17 and 18 enables the easy exploration of what is contained in the first and second parts 13 and 14 with consequent ease of intervention for maintenance, repair or the like.

Figure 5:
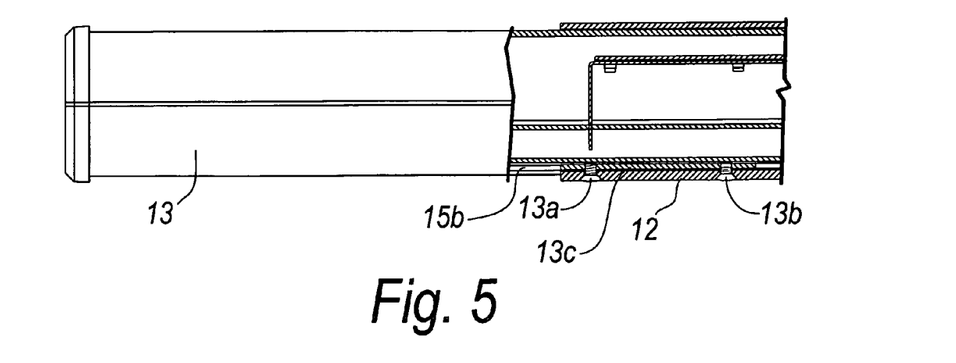
FIG. 5 is a frontal, partially sectioned view of FIG. 1a, taken along the line V-V.

As shown in FIG. 5 for a first lateral part 13, each one of the lateral parts 13 and 14 is reversibly locked to the central part 12 by way of threaded elements 13a and 13b, and 14a and 14b respectively, which are screwed to the central part 12 and to a corresponding locking plate, 13c in FIG. 5, which is inserted in the outer central groove, 15b and 16b, of the corresponding base 15 and 16.

Figure 6:
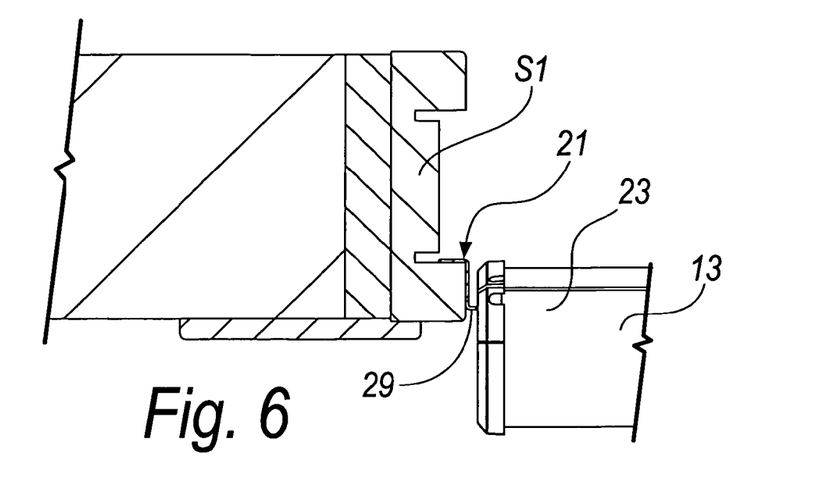
FIG. 6 is a partially sectioned view of FIG. 1a, taken along the line VI-VI.
Figure 6A:
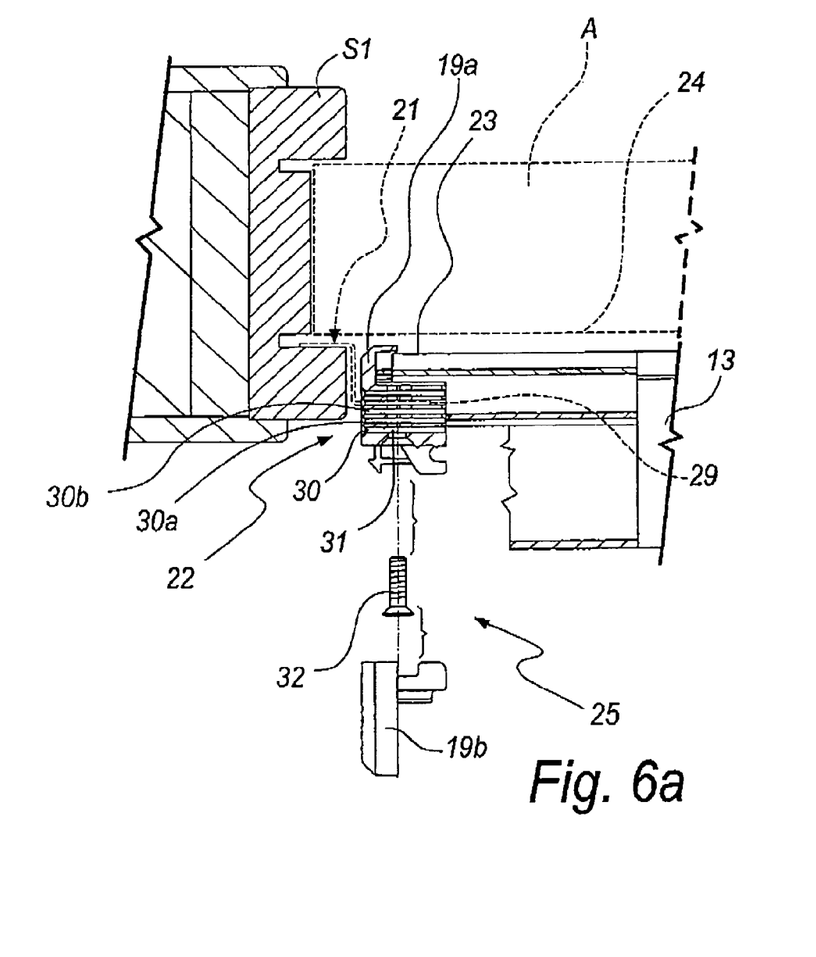
FIG. 6a is a partially sectioned view of FIG. 1a, taken along the line VIa-VIa.
Figure 7:
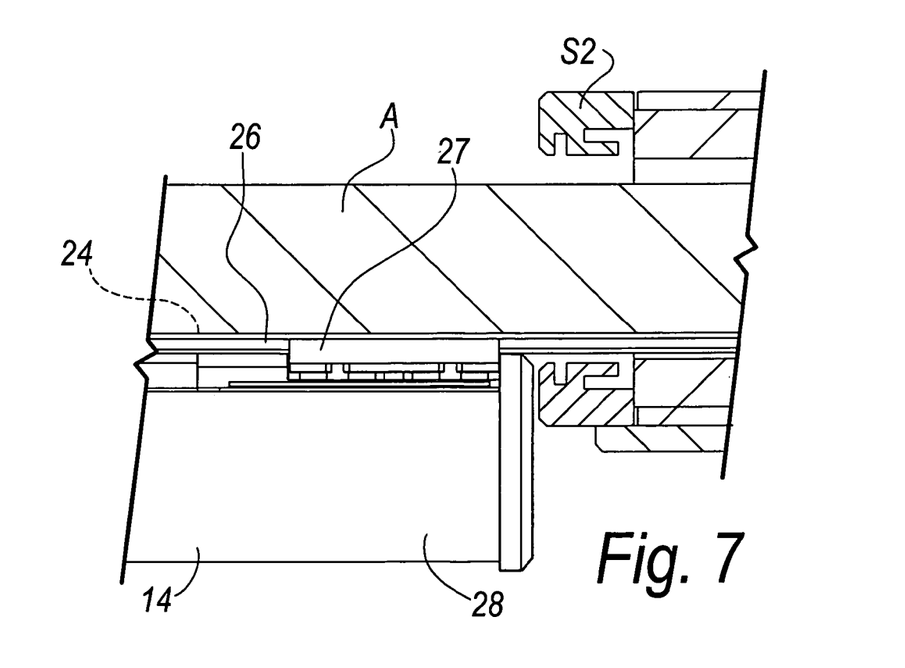
FIG. 7 is an enlarged perspective view of FIG. 1a, taken along the line VII-VII.

FIGS. 6, 6a and 7 show the means of fixing, which advantageously are adjustable and self-adapting.

Such means of fixing are constituted at one end by:
a bracket 21, to be fixed to one jamb S1,
means 22 for the adjustment of the fixing distance between a first end 23 of the box-like body 11 and the surface 24 of the leaf A of the door, which are better described hereinbelow;
means of pivoting 25 the first end 23 of the box-like body 11 to the bracket 21; while at the opposite end such adjustable and self-adapting means of fixing are constituted by:
a guide rail 26, fixed to the leaf A,
a slide 27, coupled to slide with respect to the rail 26 and integral with the opposite, second end 28 of the box-like body 11, such slide being for example fixed with threaded elements, such as screws, to a corresponding end block, not shown for the sake of simplicity, within the second end 28 of the box-like body 11.

The bracket 21 is provided with a tab 29 which is contoured to protrude from the jamb S1 to which the bracket 21 is fixed, and to protrude in the direction of the opposite jamb S2.

The tab 29 is provided with a through hole, which is adapted to cooperate with the means of pivoting of the first end 23 of the box-like body 11 to the bracket 21.

The means 22 for the adjustment of the fixing distance between the first end 23 of the box-like body 11 and the surface 24 of the leaf A of the door P comprise a block that corresponds to a first part 19a of the plug 19, arranged in the first end 23 of the box-like body 11, the first part 19a of the plug 19 containing a plurality of parallel seats arranged side by side 30, 30a, 30b and following for the perforated tab 29, clearly visible in FIG. 6a.

The choice of seat between the various seats 30 and following in which to insert the perforated tab 29 determines the distance between the box-like body 11 and the facing underlying surface 24 of the leaf A.

The choice is at the discretion of the installer and is made so as to provide a configuration of substantial parallelism between the box-like body 11 and the rail 26 on the leaf A.

The means of pivoting 25 are constituted by a through hole 31 defined so as to pass through the plurality of seats 30 and following on the first part 19a of the plug 19, for joining, with a screw 32, the perforated tab 29 to the first part 19a so that the box-like body 11 can perform angular movements about the axis of the screw 32 and of the holes of the tab and of the first part 19a of the plug 19.

When screwing is completed, the second part 19b of the plug 19 covers up the screw 32 and completes the plug 19.

Within the box-like body 11 pleated cabling 33 is provided for the drive means which is adapted to favor the orderly extension or compaction of the electrical cables in maneuvers to adjust the length of the box-like body 11.

The central part 12 of the box-like body 11 also comprises a compartment 34 for a sensor for the automatic activation of the drive means.

Figure 10:
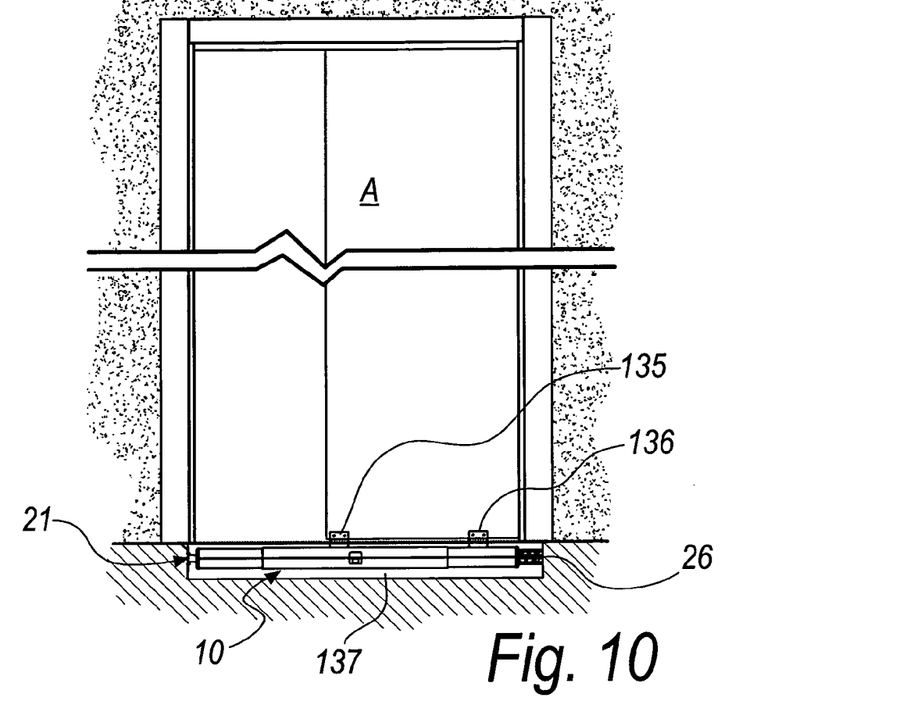
FIGS. 10 and 11 are views of a different example of application of the actuator according to the invention.
Figure 11:
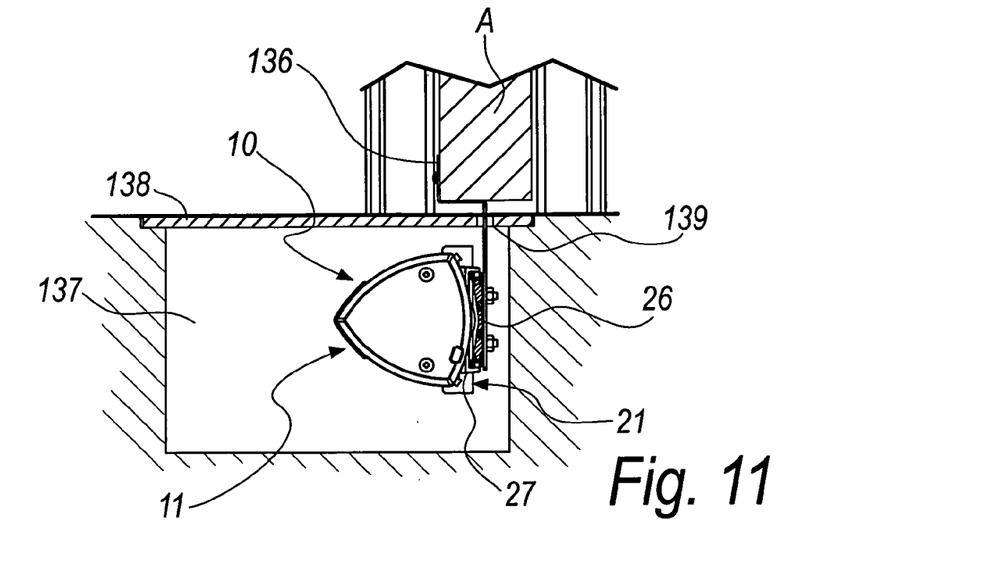

FIGS. 10 and 11 show a variation of application of the linear actuator 10 according to the invention. In such variation the rail 26 is carried, overhanging, by corresponding brackets 135 and 136 which protrude below the lower edge of the leaf A.

The linear actuator 10 is recessed in a compartment 137 defined below the leaf A and hidden by a closing plate 138 provided with a slit 139 for the sliding of the brackets 135 and 136.

Similarly to what is described above, the box-like body 11 is coupled at one end with a bracket 21 with a perforated hingeing tab screwed to the plug 19, and at the opposite end by way of a slide 27 coupled to the rail 26.

Figure 12:
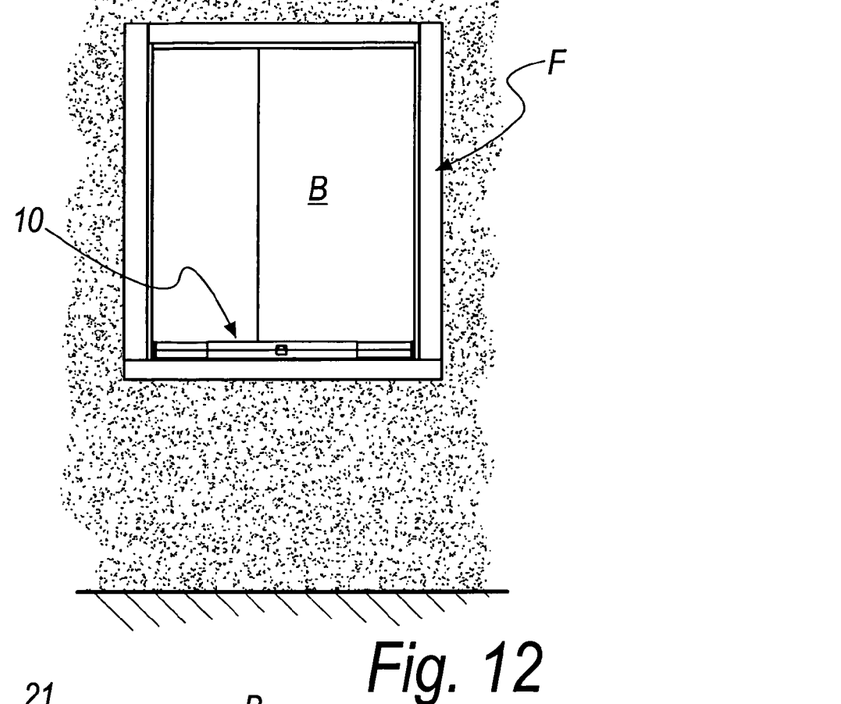
FIGS. 12 and 13 are views of a further example of application of the actuator according to the invention.
Figure 13:
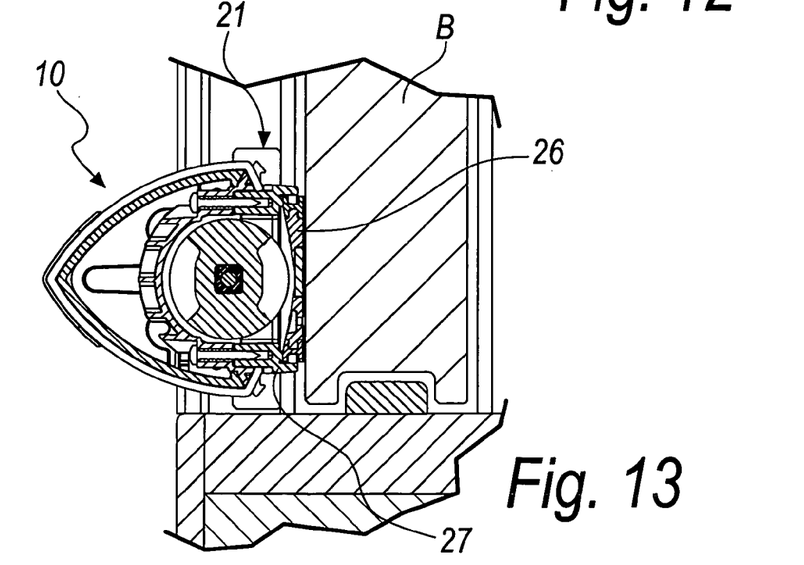

FIGS. 12 and 13 show a further variation of application of the linear actuator 10 according to the invention. In such variation the rail 26 is arranged at the lower edge of a shutter B of a window F.

Similarly to what is described above, the box-like body 11 is coupled at one end with a bracket 21 with a perforated hingeing tab screwed to the plug 19, and at the opposite end by way of a slide 27 coupled to the rail 26, the rail 26 being fixed to the shutter B.

Such an actuator 10 according to the invention can also be provided so as to be installable on curved leaf doors, it being necessary and sufficient to contour the central part and the lateral parts with the adapted correct curvatures, so that the lateral parts can be slid out of or reenter the central part without problems.

Figure 14:
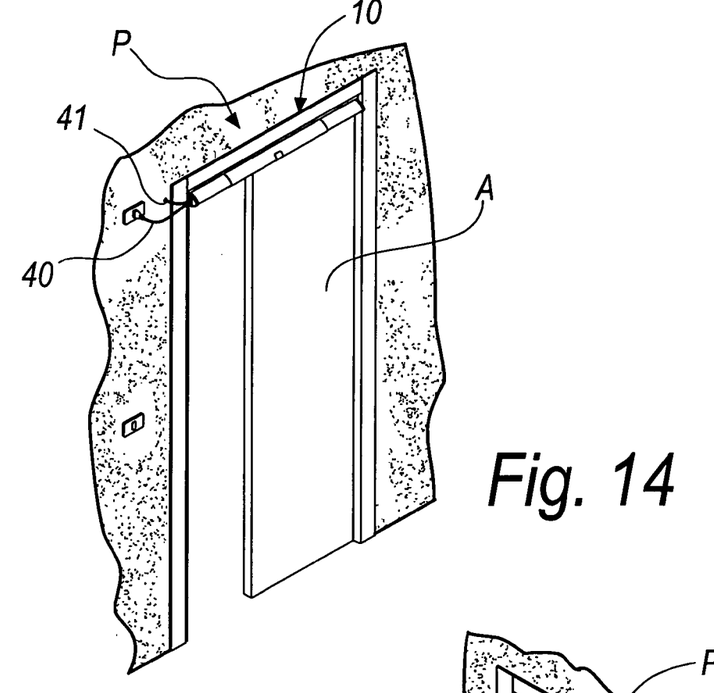
FIG. 14 shows electrical connections for the actuator according to the invention once installation is complete.

Advantageously, the linear actuator 10 according to the invention is prewired, thanks to the cable 40 with pin as shown in FIG. 14.

Figure 15:
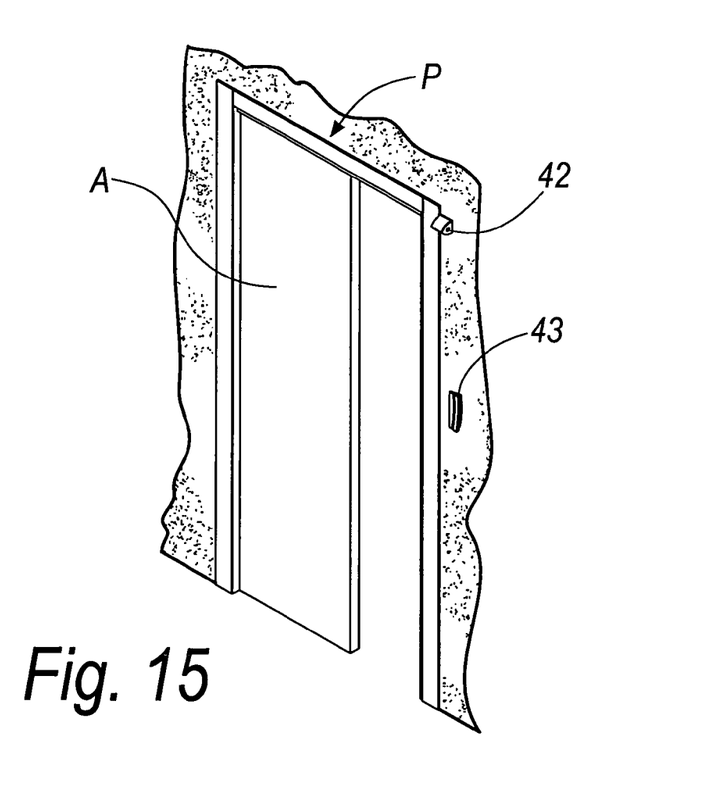
FIG. 15 is a view of the actuator according to the invention installed with an associated sensor and associated commands.

A further cable 41 is for connection to a second activation sensor 42, outside the box-like body 11 and adapted to be wall-mounted at the opposite end of the door P with respect to the side where the box-like body 11 is mounted, as in FIG. 15.

FIG. 15 also shows a radio control keypad 43.

The installation of the linear actuator 10 according to the invention is thus very simple and intuitive, it being necessary and sufficient to:
adjust the length of the box-like body 11 by acting on the lateral parts 13 and 14 and on the respective threaded elements 13a, 13b, 14a and 14b;
mount the bracket 21 onto a first jamb S1,
mount the rail 26 onto the leaf A;

pivot the first part 19a of the plug 19 to the perforated tab 29 of the bracket 21;

fix the second end 28 of the box-like body 11 to the rail 26 by way of the slide 27 and corresponding threaded elements.

By way of non-limiting example of the invention, the linear actuator 10 is of the type with permanent magnets, comprising a moving part, i.e. the rail 26, to be coupled integrally to a first body, i.e. the leaf A, which is adapted to be moved with respect to a second fixed body, i.e. the box-like body 11, and a fixed part, i.e. the drive means, to be coupled integrally to the box-like body 11.

Figure 8:
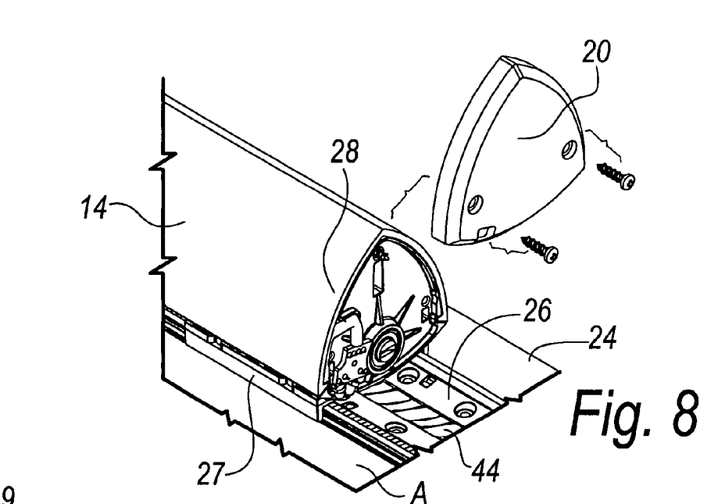
Figure 9:
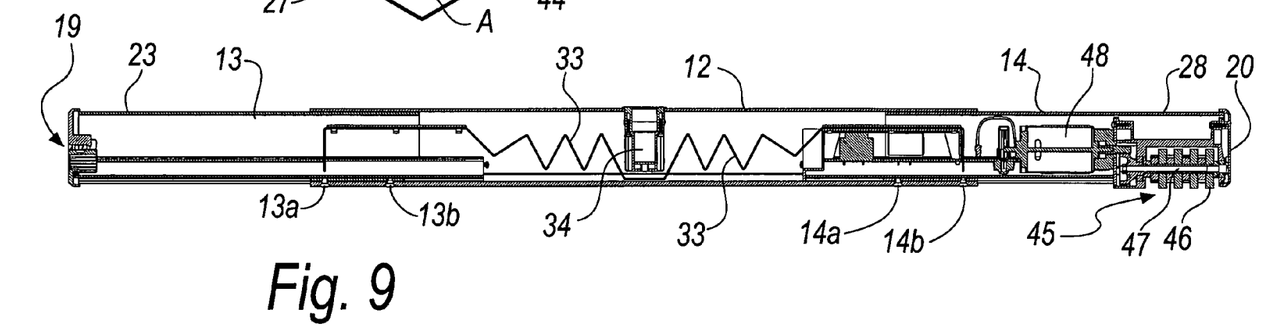
FIG. 9 is a sectioned view of FIG. 1a, taken along the line IX-IX.

The rail 26 is provided, as in FIG. 8, with a first series of first permanent magnets 44 aligned in a row extending in the direction of translational motion, while the drive means comprise, facing the row of first permanent magnets 44, a rotor element 45, shown in FIG. 9, comprising a second series of second permanent magnets 46, supported by a shaft 47 associated with an electric motor 48, the second magnets 46 being arranged side by side in the direction of the axis of the shaft, with polarities out of phase by a predetermined angle, as disclosed and claimed in WO 2009/062834 in the name of this same applicant.

In practice it has been found that the invention fully achieves the intended aim and objects.

In particular, with the invention a linear actuator has been devised which thanks to the lateral parts that can be telescopically slid out from the central part is capable of being easily adapted to any width of the opening of the door with which it is intended to be used.

Moreover, with the invention a linear actuator has been provided that is compact and easy to apply, even for a person with no special prior training, thanks to the above mentioned ease of installation.

Moreover, with the invention a linear actuator has been provided that is easy to assemble.

What is more, with the invention a linear actuator has been devised which is particularly adapted to receive drive means of the type with permanent magnets.

Furthermore, with the invention a linear actuator has been devised which can be applied to door leaves and to window shutters, both in an upper position, and in a lower position, either recessed in the floor for a door, or in the wall for a window.

Last but not least, with the invention a linear actuator particularly for sliding doors has been devised which can be made using known systems and technologies.

The invention, thus conceived, is susceptible of numerous modifications and variations, all of which are within the scope of the appended claims. Moreover, all the details may be substituted by other, technically equivalent elements.

In practice the materials employed, as well as the contingent dimensions and shapes, may be any according to requirements and to the state of the art.

The disclosures in Italian Patent Application No. PD2011A000127 from which this application claims priority are incorporated herein by reference.

What is claimed is:

1. A linear actuator for a closure element having two jambs and a sliding leaf, the linear actuator comprising
    a box body,
    fixing elements for fixing said box body between the two jambs of the closure element, in order to move the leaf by translational motion,
    a fixed drive accommodated within said box body, said fixed drive being adapted to move corresponding transmission elements connectable to said sliding leaf,
    said box body being telescopic in structure in order to be adapted in length to a width of a space between the two jambs,
    said fixing elements comprise at a first end of said box body:
        a bracket with a tab, to be fixed to one jamb,
        an adjustor for adjustment of a fixing distance between said first end of said box body and a surface of the sliding leaf;
        and a pivoting connection for pivoting said first end of said box body to said bracket, and
    said fixing elements comprising at a second opposite end of the box body:
        a guide rail, fixable to said leaf,
        a slide, coupled to slide with respect to said rail and integral with the opposite second end of the box body,
    said adjustor for the adjustment of the fixing distance between said first end of said box body and the surface of the leaf of the door comprise a block, defined by a first end of a plug, arranged in said first end of the box body, containing a plurality of parallel seats arranged side by side for said tab, the choice of the seat in which to insert said tab determining the distance between said box body and a facing underlying surface of the leaf of the door,
    wherein said pivoting connection comprises a through hole defined so as to pass through said plurality of seats on said first part of said plug, for joining, with a screw, said tab to said first part so that the box body can perform angular movements about the axis of said screw prior to fixing the second end of said box body to the rail.

2. The actuator according to claim 1, wherein said box body comprises a central tubular part and at least one lateral part that can be telescopically slid out from said central part.

3. The actuator according to claim 2, comprising two of said at least one lateral part.

4. The actuator according to claim 3, wherein said lateral parts each comprise a base and a cover, which is removable, for the inspection within thereof.

5. The actuator according to claim 2, wherein said central part of the box body comprises a compartment for a sensor for an automatic activation of the fixed drive.

6. The actuator according to claim 1, wherein the tab is contoured to protrude from one of the two jambs to which said bracket is to be fixed, in a direction of the other one of the two jambs, said tab being provided with a through hole, which is adapted to cooperate with the pivoting connection of the first end of the box body to said bracket.

7. The actuator according to claim 1, wherein within said box body a pleated cabling is provided for the fixed drive, which is adapted to favor an orderly extension or compaction of electrical cables in maneuvers to adjust the length of the box body.

8. The actuator according to claim 1, wherein said rail is carried by at least one bracket for protruding below a lower edge of the leaf, said linear actuator being recessed in a compartment adapted to be arranged below the leaf and hidden by a closing plate provided with a slit for the sliding of said at least one bracket.

9. A closure element having two jambs and a sliding leaf, and a linear actuator for moving the sliding leaf, comprising
    a box body of the linear actuator,
    fixing elements that fix said box body between the two jambs of the closure element, in order to move the leaf by translational motion,
    a fixed drive accommodated within said box body, said fixed drive being adapted to move corresponding transmission elements connected to said sliding leaf, said box body being telescopic in structure in order to be adapted in length to a width of a space between the two jambs, said fixing elements comprise at a first end of said box body:
- a bracket with a tab, fixed to one jamb,
- an adjustor for adjustment of a fixing distance between said first end of said box body and a surface of the sliding leaf,
- and a pivoting connection for pivoting said first end of said box body to said bracket, and said fixing elements comprising at a second opposite end of the box body:
- a guide rail, fixed to said leaf,
- a slide, coupled to slide with respect to said rail and integral with the opposite second end of the box body, said adjustor for the adjustment of the fixing distance between said first end of said box body and the surface of the leaf of the door comprise a block, defined by a first end of a plug, arranged in said first end of the box body, containing a plurality of parallel seats arranged side by side for said tab, the choice of the seat in which to insert said tab determining the distance between said box body and a facing underlying surface of the leaf of the door, wherein said pivoting connection comprises a through hole defined so as to pass through said plurality of seats on said first part of said plug, for joining, with a screw, said tab to said first part so that the box body can perform angular movements about the axis of said screw prior to fixing the second end of said box body to the rail.

10. The closure element with linear actuator of claim 9, wherein said box body comprises a central tubular part and at least one lateral part that can be telescopically slid out from said central part.

11. The closure element with linear actuator of claim 10, wherein said at least one lateral part comprises a base and a cover, which is removable, for the inspection within thereof.

12. The closure element with linear actuator of claim 9, wherein the tab which is contoured to protrude from one of the two iambs to which said bracket is fixed, in a direction of the other one of the two iambs, said tab being provided with a through hole, which is adapted to cooperate with the pivoting connection of the first end of the box body to said bracket.

13. The closure element with linear actuator of claim 9, wherein within said box body a pleated cabling is provided for the fixed drive, which is adapted to favor an orderly extension or compaction of electrical cables in maneuvers to adjust the length of the box body, and wherein said central part of the box body comprises a compartment for a sensor for an automatic activation of the fixed drive.

* * * * *